(No Model.)
J. BUECHNER.
TOE WEIGHT.
No. 503,404.  Patented Aug. 15, 1893.
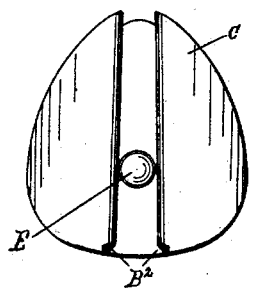
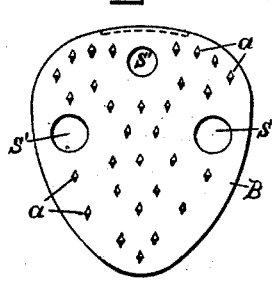
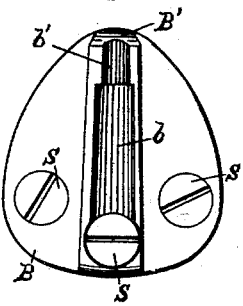
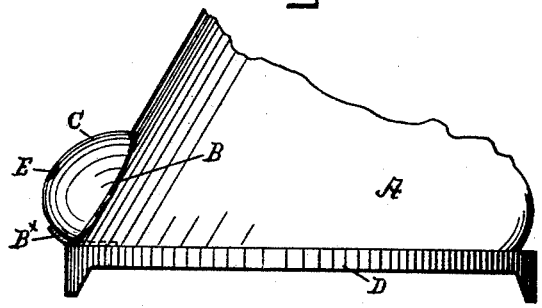
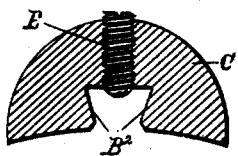
Witnesses.  Inventor.
P. M. Metcalf  John Buechner
J. P. Thomas  By Martin Metcalf
 Atty.

UNITED STATES PATENT OFFICE.

JOHN BUECHNER, OF BATTLE CREEK, MICHIGAN.

TOE-WEIGHT.

SPECIFICATION forming part of Letters Patent No. 503,404, dated August 15, 1893.

Application filed October 26, 1892. Serial No. 450,031. (No model.)

*To all whom it may concern:*

Be it known that I, JOHN BUECHNER, a citizen of the United States, residing at Battle Creek, in the county of Calhoun and State of Michigan, have invented certain new and useful Improvements in Toe-Weights for Horses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain improvements in the construction and attachment of toe-weights to the hoofs of horses; and the device consists of two members, or parts; the first of which is firmly fixed to the horse's hoof by means of screws and integral spurs, or barbs. The second part or member thereof is removably and adjustably secured to the fixed part by means of a single set-screw, in such a way that the same may be instantly adjusted vertically, or detached altogether, and a lighter or heavier toe-weight substituted at the same time that the said weight is secured against accidental displacement, substantially as hereinafter shown, illustrated, described and claimed.

In the illustrations, the letters used designate like parts in all the views.

Figure 1. is a side view of the device attached to the hoof of a horse. Fig. 2, shows the inner face of the removable and adjustable toe-weight. Fig. 3, is a transverse sectional view of the same, drawn on a line cutting the securing set-screw. Fig. 4, is an inner face view of the fixed plate. Fig. 5, shows the opposite side of the same, and Fig. 6, represents a cross-section thereof.

Referring to the letters, A, represents the hoof of the horse.

B, is the fixed plate, and C, represents one of a series of different sized toe-weights adapted for instant attachment and adjustment to and from any point of the said fixed plate B. The inner face of this fixed plate is provided with numerous integral barbs, or spurs, $a$, which project from its plane in such manner that they penetrate the hard substance of the horse's hoof when the fixed plate is forcibly drawn tight to the hoof in the act of attaching said fixed plate by means of the usual and well known fastening screws, S, said plate being provided with screw holes S' for the passage of such attaching screws.

Located vertically and centrally of the fixed plate B, on the side opposite the spurs $a$, is a downwardly projecting and outwardly flaring dovetail shaped bar, B', provided with an outwardly opening, semi-circular longitudinal channel $b$, which is abruptly contracted near its uppermost extremity for a purpose hereinafter appearing. Said bar B' is chamfered or undercut on opposite sides as seen at $b^\times$ from its upper end down almost to its base leaving a projecting shoulder $B^\times$ on each side thereof at the bottom.

The removable and adjustable series of toe-weights C are each provided with central vertical inner channels $B^2$ corresponding in form with the said bar B', of the fixed plate B, with which said channel engages, and whereby the toe-weight C, is properly placed by sliding the same down from above, on said projecting bar of the plate B, until the weight comes to a rest with its lower edge or side in contact with the said shoulders $B^\times$ at each side of the bottom of bar B' as clearly seen in Fig. 1. The series of toe-weights, C, each carry a set-screw E, which serves to secure the said weight at any desired point of the bar B', of the fixed plate B, while the reduced diameter $b'$ of the channel of said bar, near its top, presents a shoulder, against which the inner extremity of the set-screw E, may impinge, and stop the weight from flying upward too far, and off the bar, in case of the accidental loosening of the said set-screw E. By forming the groove $b$ with a reduced upper portion $b'$ it will be seen that the several weights C may be securely fastened to the plate B by a single turn of the set-screw E or may be released from said plate by a single turn of said set screw in an opposite direction. The contracted upper portion $b'$ of groove $b$ being deepest along its center admits of the passage of the tip of a conical pointed screw E such as is usually employed whereby it is not necessary to turn said screw until its tip lies inside the tapped opening of weight C, as would be necessary were no such contracted portion $b'$ of groove $b$ provided.

It will be seen that when the weight is applied with the tip of the screw protruding as seen in Fig. 3 it will be only necessary to give one turn to said screw whereupon its tip will have passed below the plane of the bottom of the contracted portion $b'$ of groove $b$ and the weight will be held securely in position.

Having thus clearly and fully divulged the nature, manner of making, and mode of operation of my novel and useful toe-weight for horses, what I claim, and desire to secure by Letters Patent of the United States, is as follows, viz:

1. The combination with the fixed plate provided with means of attachment to the hoof and having a projecting bar on its outer face, the face of said bar having a semi-cylindrical groove extending from its upper end to near its base, said groove having a contracted semi-cylindrical upper end, of a removable weight adapted for engagement with said bar, said weight having a set-screw adapted to engage the groove therein, substantially as set forth.

2. The combination with the fixed plate provided with a projecting bar on its outer face, the face of said bar having a longitudinal groove extending from its upper end downward, and a screw set through said bar and plate at the lower end of said groove, said screw serving as a means of attachment of the fixed plate to the hoof and also forming a shoulder at the base of said groove, of a removable weight adapted to be secured to said bar, said weight having a set-screw adapted to engage the groove therein, substantially as set forth.

3. The combination with the fixed plate provided with means of attachment to the hoof and having a projecting bar arranged on its outer face, said bar having under-cut sides and a longitudinally grooved face, the undercutting of the sides and the longitudinal groove of the face extending from the upper end of said bar and ending above its base, whereby a shoulder is formed at the lower end of each groove, of a removable weight having a longitudinal dovetail slot adapted to receive said bar on the fixed plate, the lower end of said slot being enlarged to receive said shoulders at the lower ends of said grooved sides of the bar, said weight being provided with a set-screw which engages the groove in the face of said bar, as set forth.

In testimony whereof I affix my signature in presence of two witnesses.

JOHN BUECHNER.

Witnesses:
 M. METCALF,
 W. J. GARFIELD.